J. M. SAUSER.
MEASURING CABINET.
APPLICATION FILED JUNE 19, 1908.
912,896.
Patented Feb. 16, 1909.
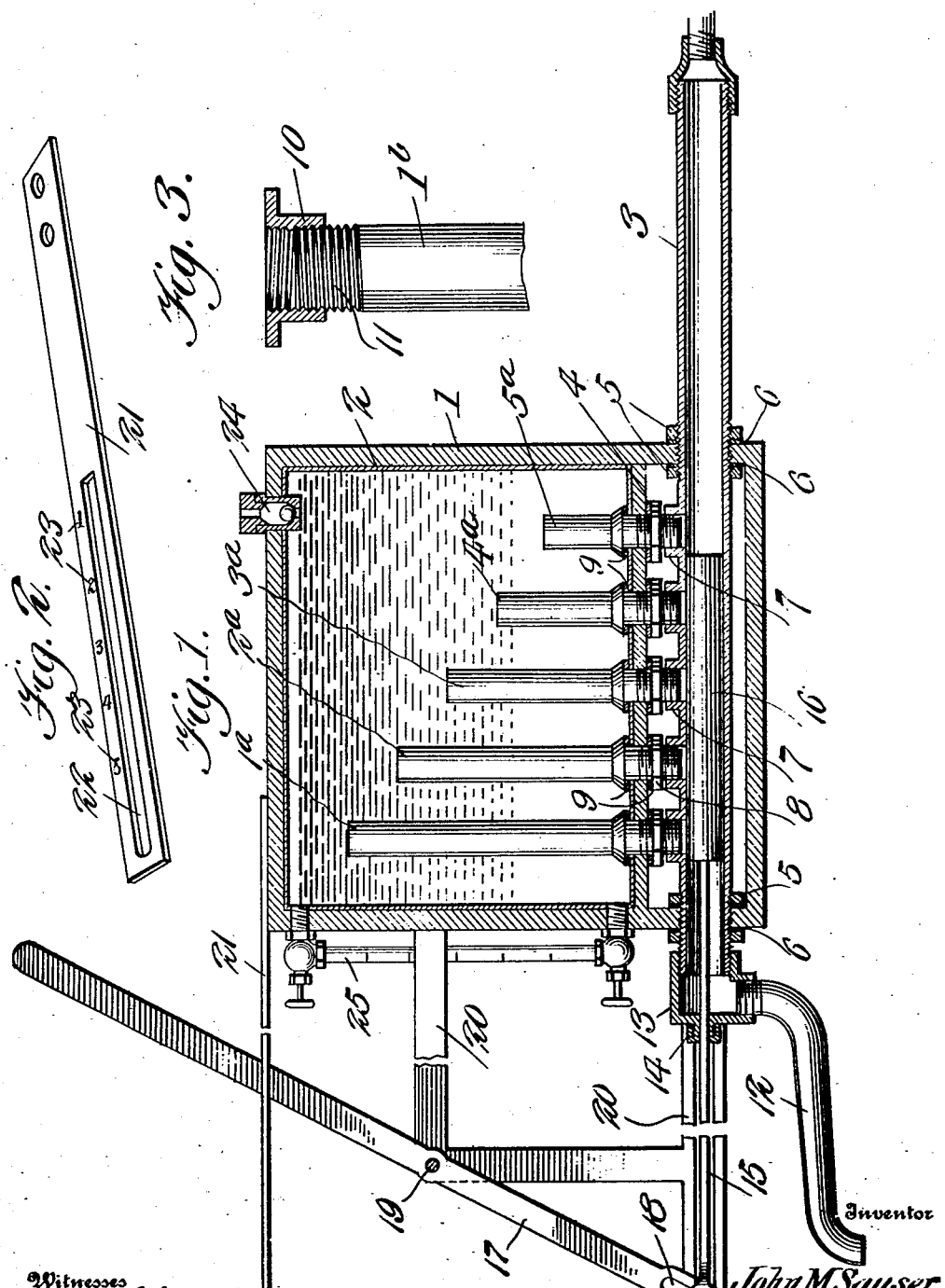
Witnesses
Inventor
John M. Sauser
By Victor J. Evans
Attorney

UNITED STATES PATENT OFFICE.

JOHN M. SAUSER, OF BELLWOOD, NEBRASKA.

MEASURING-CABINET.

No. 912,896.  Specification of Letters Patent.  Patented Feb. 16, 1909.

Application filed June 19, 1908. Serial No. 439,456.

*To all whom it may concern:*

Be it known that I, JOHN M. SAUSER, a citizen of the United States of America, residing at Bellwood, in the county of Butler and State of Nebraska, have invented new and useful Improvements in Measuring-Cabinets, of which the following is a specification.

This invention relates to measuring cabinets, and one of the principal objects of the same is to provide a liquid measuring cabinet or tank for containing a given quantity of liquid and to provide means whereby any number of gallons may be withdrawn from the tank or cabinet and automatically measured as it is withdrawn.

Another object of the invention is to provide a liquid measuring device having a series of outlet pipes extending at different heights within the tank and to provide a moving valve which may be adjusted to permit the liquid to flow through any one or more of the outlet pipes and to thus measure the quantity of liquid dispensed.

These and other objects may be attained by means of the construction illustrated in the accompanying drawing, in which,—

Figure 1 is a vertical longitudinal section through a measuring device made in accordance with my invention. Fig. 2 is a detail perspective view of the gage plate and indicator. Fig. 3 is a sectional view of a flanged nut adjustable at the inlet end of one of the outlet pipes to regulate the quantity of liquid dispensed.

Referring to the drawing, the numeral 1 designates a cabinet or tank of predetermined capacity. The one shown in the drawing is supposed to contain about six gallons of oil, vinegar or other liquid to be dispensed. A suitable impervious lining 2 is provided for the tank or cabinet 1. A supply pipe 3 leading to an enlarged supply tank extends through near the bottom of the cabinet, and a partition 4 is interposed between the tank 1 and the supply pipe 3. The supply pipe is secured to the tank or cabinet by means of lock nuts 5 and intermediate rubber or leather gaskets 6. Formed in the supply pipe are a series of threaded bosses 7. A series of outlet pipes $1^a$, $2^a$, $3^a$, $4^a$ and $5^a$ of different lengths extend into the tank or cabinet 1, and the lower ends of these pipes extend through the partition 4 and are fitted into the bosses 7 by means of nuts 8 and gaskets 9. As shown in Fig. 3, an outlet pipe $1^b$ is provided with a flanged nut 10 adjustable upon threads 11 of the pipe to extend above the opening therein and to thus regulate the exact quantity of liquid to be dispensed through said pipe. Connected to the outlet end of the supply pipe 3 is a single spout 12, said spout being connected at its upper end to a two-way fitting 13, said fitting being provided with a stuffing box 14 to accommodate the reciprocating valve stem 15 connected at one end to a solid sliding valve 16 fitted in the supply pipe 3 immediately under the outlet pipes $1^a$, $2^a$, $3^a$, $4^a$ and $5^a$. The opposite end of the stem 15 is connected to a lever 17 provided with a slot 18 and pivoted at 19 to a frame 20 secured to the tank 1.

A gage plate and indicator 21 is secured to the tank 1 and provided with a slot 22 through which the handle of the lever 17 passes, and at the side of the slot 22 indicating numbers 23 are provided. A check valve 24 extends through the wall of the tank or cabinet 1, and a glass indicator 25 is secured at one side of the tank to indicate the liquid line within the tank.

The operation of my invention may be briefly described as follows: In the position shown in Fig. 1 the outlet pipe $5^a$ is in communication with the supply pipe 3, and hence the pressure of liquid through the pipe 3 will always keep the tank 1 filled with liquid. Should it be desired to withdraw one gallon of the liquid from the tank 1, the lever 17 is moved to the left in Fig. 1 until it reaches the indicating number 1 on the gage plate 21. This will place the outlet pipe $1^a$ into communication with the supply pipe 3 at the left of the valve 16, and the liquid from the top of the tank will flow through said pipe $1^a$ through the spout 12. The quantity of liquid in the tank above the end of the pipe $1^b$ represents one gallon, and hence after the gallon has been withdrawn the flow of liquid ceases. The lever is then pushed toward the right to the position shown in Fig. 1 to permit the tank to again fill. Should two gallons be required the lever is moved to the numeral 2 on the gage plate, and liquid will flow through pipes $1^a$ and $2^a$ until the liquid line reaches a point just below the top of the pipe $2^a$, and hence two gallons have been withdrawn. In this way any suitable number of gallons may be withdrawn from the tank 1 and measured automatically.

My device is of simple construction, cannot readily get out of order, is always ready for use and can be manufactured at slight cost.

Having thus described the invention, what is claimed as new, is:—

A liquid measuring device comprising a cabinet for containing a predetermined quantity of liquid, a supply pipe leading to the bottom of the cabinet, a series of outlet pipes connected with said supply pipe, said outlet pipes being of different lengths, a discharge spout connected to the supply pipe, a sliding valve for placing one or more of the outlet pipes into communication with the discharge spout, and a lever for moving said valve.

In testimony whereof I affix my signature in presence of two witnesses.

JOHN M. SAUSER.

Witnesses:
   A. R. BRANDENBURGH,
   H. W. BULLER.